April 3, 1951

H. TRECKMAN 2,547,894

DEVICE FOR STRIPPING ANNULAR ELASTIC
RUBBER ARTICLES FROM A CORE

Filed July 30, 1949

INVENTOR
Henry Treckman
BY Evans + McCoy
ATTORNEYS

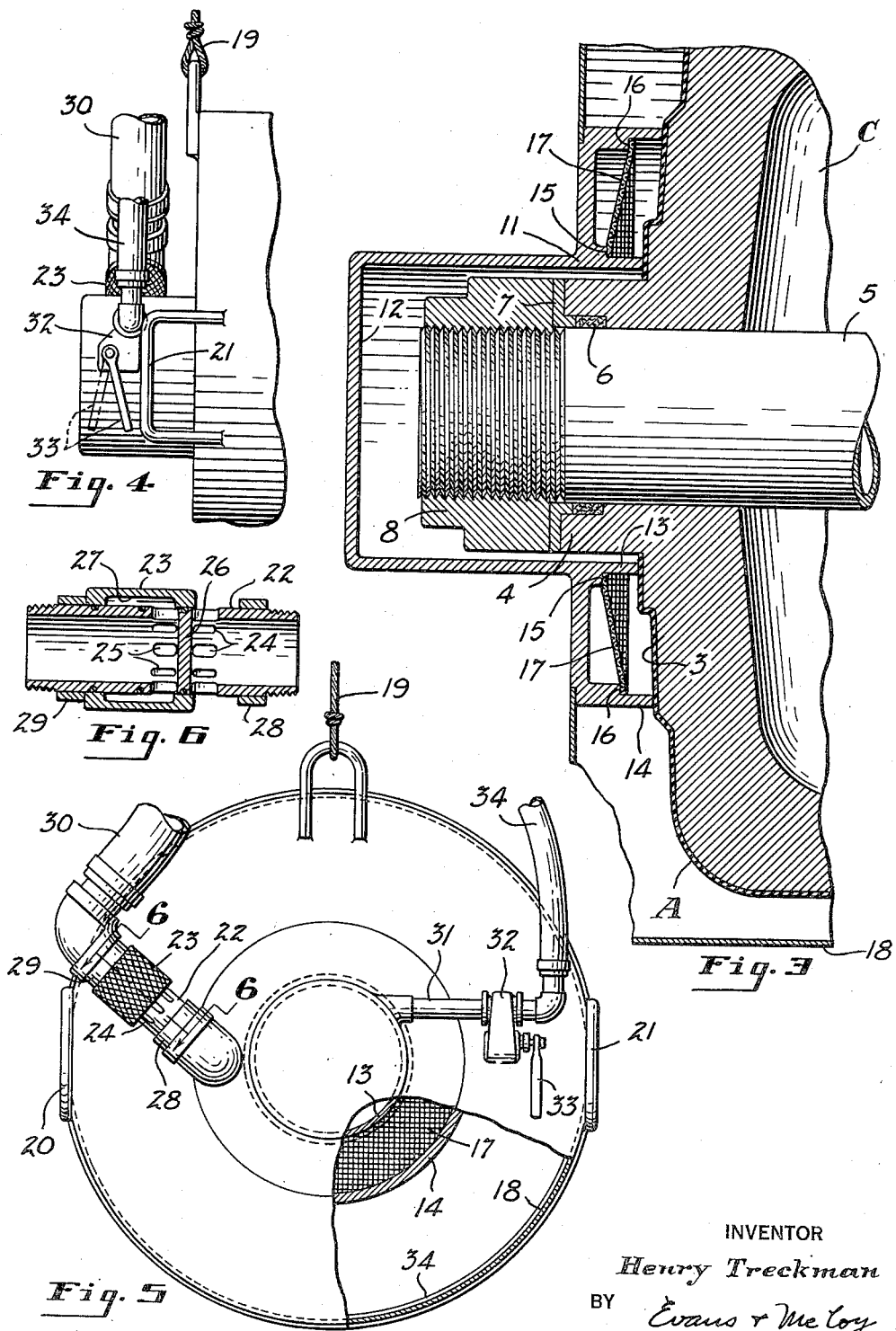

Patented Apr. 3, 1951

2,547,894

UNITED STATES PATENT OFFICE 2,547,894

DEVICE FOR STRIPPING ANNULAR ELASTIC RUBBER ARTICLES FROM A CORE

Henry Treckman, Wabash, Ind., assignor to The General Tire and Rubber Company, Akron, Ohio, a corporation of Ohio Application July 30, 1949, Serial No. 107,680

5 Claims. (Cl. 18—2)

The present invention is a device for stripping annular elastic rubber articles from a rigid core upon which the article has been molded.

The invention has for its object to provide a stripping device that utilizes fluid pressure to free the elastic rubber article from the core in such manner that the article is substantially instantaneously stripped from the mold.

A further object of the invention is to provide a stripping device that is simple, inexpensive and easily manipulated.

With the above and other objects in view, the invention may be said to comprise the core stripping device as illustrated in the accompanying drawings and hereinafter described, together with such variations and modifications thereof as will be apparent to one skilled in the art to which the invention pertains.

Reference should be had to the accompanying drawings forming a part of this specification, in which:

Fig. 3 is a fragmentary axial section on an enlarged scale showing the stripper head positioned with its suction nozzle in engagement with an edge portion of the annular rubber article overlying the outer end shoulder of the core;

Fig. 4 is a fragmentary side elevation showing one of the stripper handles and the pressure controlling valve that is positioned alongside the handle;

Fig. 5 is a front elevation of the stripper with a portion broken away to show a segment of the annular suction nozzle in vertical section; and Fig. 6 is a transverse section taken on the line indicated at 6—6 in Fig. 5 and showing the suction controlling valve.

Figure 1:
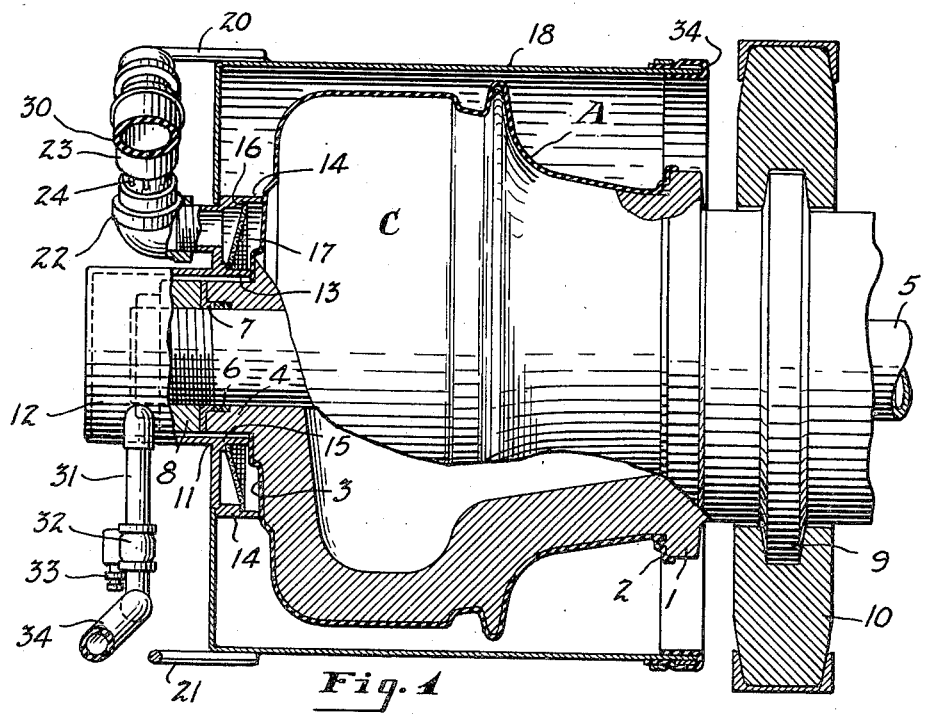
Figure 1 is a horizontal axial section through the stripping device and core, the fluid pressure connections attached externally to the stripper being shown in plan.

In the accompanying drawings the invention is shown applied to a stripper for removing an elastic rubber washing machine tub from the core upon which it has been molded, the rubber tub being designated A and the core C.

The core C has an inner portion of reduced diameter terminating in a positioning flange 1 against which a bead 2 is molded. At its outer end the core is provided with a shoulder 3 against which lies the bottom portion of the tub A. At its outer end the core has a tubular axial projection 4 for engagement with end portions of the vulcanizing mold. The core C is supported upon a horizontal tube 5 which extends through the tubular extension 4 and which provides a support for the core by means of which the core may be carried to a position clear of the vulcanizing mold. A fluid tight connection is preferably provided between the core C and the tube 5 at the outer end of the core by means of a sealing ring 6 that is held in place by a gland 7 pressed against the ring 6 by means of a nut 8 which also serves to retain the core C on the tube 5.

Beyond the inner positioning flange 1 the core C is provided with an external rib 9 which serves to position a mold engaging collar 10. The annular elastic rubber article A is vulcanized upon the core C in a suitable vulcanizing mold which is clamped to the core and which provides therewith a mold cavity in which the article A is molded.

The device of the present invention is a device for stripping the elastic rubber article A from the core after the core has been shifted to a position clear of the mold after the vulcanizing operation. The stripping device has a head 11 that is formed to provide a central recess 12 of a diameter slightly larger than the axial projection 4 of the core so that when the head is positioned with the projection 4 within the central recess 12, the head is substantially coaxial with the core. The head 11 is formed to provide an annular suction nozzle on its inner face that is adapted to engage with the portion of the rubber article A surrounding the axial projection 4 and lying upon the end shoulder 3 of the core.

The annular suction nozzle is formed by two concentric annular ribs 13 and 14 on the head 11 which surround the central recess 12 and which have free edges positioned to simultaneously engage radially spaced portions of the rubber article A lying upon the shoulder 3. The annular ribs 13 and 14 have external and internal shoulders 15 and 16, respectively, that are spaced from their free edges and that provide seats to which an annular screen 17 is attached. When suction is applied to the nozzle, the annular edge portion of the rubber article A is drawn into the nozzle and against the screen 17.

In the operation of the device suction is first applied to the annular nozzle to draw the edge portion of the article A against the screen 17 and separate the same from the core shoulder. Immediately after application of suction to the nozzle, fluid under pressure is introduced into the central recess 12 of the head, and this fluid entering between the article A and the surface of the core frees the elastic rubber wall of the article A from the core, and exerts an axial outward pressure on the head to strip the article from the core.

The head is preferably provided with an axially extending cylindrical wall 18 which is of a diameter to receive the core and of a length to extend substantially the full length of the core. The wall 18 serves to limit the radial expansion of the elastic rubber article A by the fluid under pressure introduced between the rubber article and the core C so that the fluid under pressure acts effectively upon the rubber article A and the head 11 to exert an axial outward thrust thereon to strip the article from the core.

To facilitate the handling of the stripping device, a suspension cable 19 is attached to the top thereof and may be connected to a suitable overhead carriage (not shown). A pair of horizontally alined handles 20 and 21 are attached to diametrically opposite portions of the stripper by means of which an operator can quickly and easily move the stripper into position on the core.

The suction conduit connected to the annular suction nozzle of the head has a laterally extending portion 22 closely adjacent the outer side of the head which supports a valve sleeve 23 alongside the handle 20 where the operator can readily actuate the sleeve with the thumb of the hand gripping the handle 20. The laterally extending portion 22 of the conduit has longitudinally spaced circumferential rows of openings 24 and 25 that are disposed on opposite sides of a closure web 26 across the interior of the conduit. The interior of the sleeve 23 has an axially elongated recess 27 on its interior face. The axial movement of the sleeve is limited by stop collars 28 and 29. When the sleeve 23 is in engagement with the outer collar 29 the openings 24 connect the nozzle to the atmosphere and the web 26 and sleeve 23 close the suction conduit. When the sleeve 23 is moved into engagement with the stop collar 28 communication is established between the suction conduit and nozzle through the openings 24 and 25 and the recess 27 of the sleeve. By moving the sleeve 23 to its inner limit of movement, suction is created in the annular suction nozzle, and by moving the sleeve 23 axially to its outer limit of movement, suction is cut off and air under atmospheric pressure is supplied to the nozzle through the openings 24 to break the vacuum.

A flexible hose 30 connects the portion 22 of the suction conduit to a suitable source of vacuum. The pressure conduit for delivering fluid under pressure to the central recess 12 of the stripper head has a laterally extending portion 31 adjacent the outer side of the head which has a valve 32 operated by a pivoted handle 33 that is positioned alongside the handle 21 in a position where it can be conveniently operated by the thumb of the hand gripping the handle 21.

The cylindrical core receiving wall 18 is preferably provided with a rubber cushioning strip 34 suitably attached thereto and covering its free edge to prevent gouging of the rubber article on the mold core.

Figure 2:
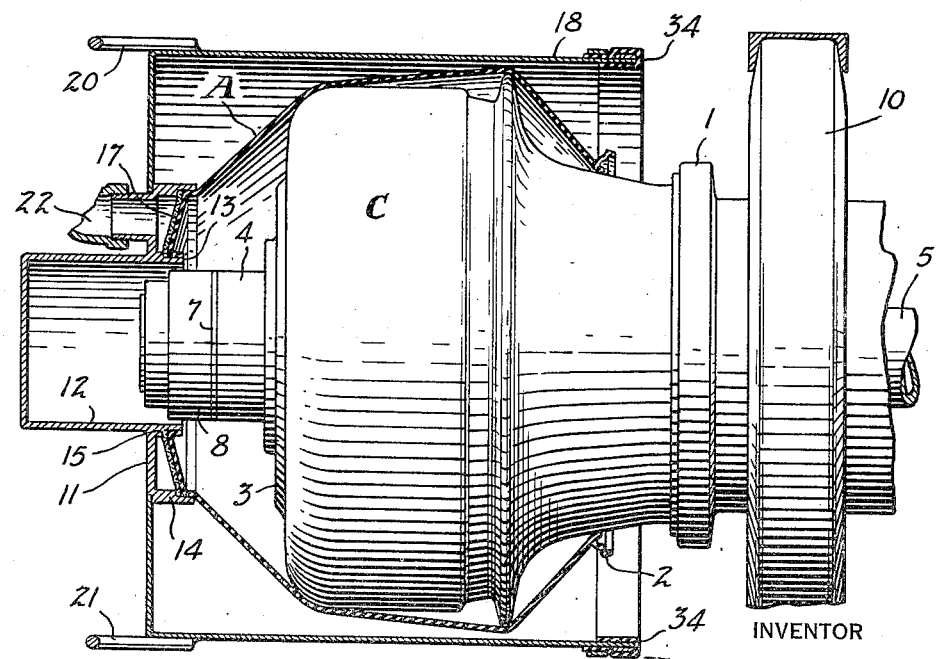
Fig. 2 is a horizontal axial section showing the elastic rubber article gripping to the stripper head by suction and partially freed from the core.

In the operation of the machine the operator places the stripper on the core, with the ribs 14 and 15 which form the lips of the annular suction nozzle in engagement with the annular edge portion of the article A overlying the shoulder 3 of the core. The operator then shifts the sleeve 23 to its innermost position to apply suction to the nozzle and then immediately opens the valve 31 to admit pressure to the central recess 12 of the head. The application of suction to the annular suction nozzle causes air to be drawn from the recess 12 past the edge of the article A into the space between the core shoulder and the portion of the article A overlying the shoulder, causing the elastic edge portion of the article to snap into engagement with the screen 17. With the edge portion of the article A engaged with the screen 17 as shown in Fig. 2, fluid under pressure introduced through the recess 12 enters between the article A and the core C expanding the elastic wall of the article A away from the surface of the core and against the interior of the stripper, at the same time exerting a radial outward thrust on the head 11 and article A held to the head 11 by the annular suction nozzle, to substantially instantaneously strip the article A from the core. After the article is stripped from the core the valve 32 in the pressure line is closed and the sleeve 23 is shifted to its outermost position to break the vacuum and free the article A from the head 11.

It is to be understood that in accordance with the provisions of the patent statutes variations and modifications of the specific devices herein shown and described may be made without departing from the spirit of the invention.

What I claim is:

1. A core stripper for removing an annular elastic rubber article from a core upon which it has been molded comprising a head having a central recess and an annular nozzle surrounding the recess and engageable with an annular edge portion of the article that lies upon an end shoulder of the core, a valve controlled suction conduit connected to said nozzle for creating a suction in said nozzle to draw the annular edge portion of the article away from the core and to hold the same to the head, and a valve controlled pressure conduit for delivering fluid under pressure into said central recess of the head and between the core and elastic rubber article to free the article from the core.

2. A stripping device as set forth in claim 1 in which the suction nozzle has an inset annular screen against which the annular edge portion of the article is held by suction.

3. A stripping device as set forth in claim 1 in which said head is provided with diametrically opposite handles and said conduits have manually operable valves closely adjacent said handles.

4. A stripping device as set forth in claim 1 in which the nozzle is in the form of two radially spaced annular ribs having edges that conform to the portion of the elastic rubber article on the drum shoulder.

5. A stripping device as set forth in claim 1 in which the head is provided with an axially extending peripheral wall to receive said core and to limit the radial expansion of the elastic rubber article by fluid pressure.

HENRY TRECKMAN.

REFERENCES CITED

The following references are of record in the file of this patent:

UNITED STATES PATENTS

| Number | Name | Date |
|---|---|---|
| 1,567,007 | Raiche | Dec. 22, 1925 |
| 1,809,260 | Wilson et al. | June 9, 1931 |
| 2,099,843 | Connell | Nov. 23, 1937 |